United States Patent

Breton et al.

[11] Patent Number: 5,643,357
[45] Date of Patent: Jul. 1, 1997

[54] LIQUID CRYSTALLINE INK COMPOSITIONS

[75] Inventors: Marcel P. Breton; Raymond W. Wong, both of Mississauga, Canada; William M. Schwarz, Webster, N.Y.; Yvan Gagnon, Mississauga, Canada; Stig E. Friberg, Potsdam, N.Y.

[73] Assignee: Xerox Corporation, Stamford, Conn.

[21] Appl. No.: 569,641

[22] Filed: Dec. 8, 1995

[51] Int. Cl.⁶ .................................................. C09D 11/02
[52] U.S. Cl. .................... 106/31.25; 106/31.59; 347/100
[58] Field of Search ............... 106/22 R, 20 D, 106/22 A

[56] References Cited

U.S. PATENT DOCUMENTS

| | | | |
|---|---|---|---|
| 3,246,997 | 4/1966 | Sumner et al. | 106/22 R |
| 4,840,674 | 6/1989 | Schwarz | 106/22 R |
| 4,853,036 | 8/1989 | Koike et al. | 106/20 R |
| 4,938,801 | 7/1990 | Yoshioka et al. | 106/27 R |
| 5,006,170 | 4/1991 | Schwarz et al. | 106/20 R |
| 5,021,802 | 6/1991 | Allred | 346/1.1 |
| 5,041,161 | 8/1991 | Cooke et al. | 106/22 R |
| 5,047,084 | 9/1991 | Miller et al. | 106/27 R |
| 5,065,167 | 11/1991 | You et al. | 346/1.1 |
| 5,074,915 | 12/1991 | Yoshioka et al. | 106/27 R |
| 5,122,187 | 6/1992 | Schwarz et al. | 106/25 R |
| 5,124,718 | 6/1992 | Koike et al. | 346/1.1 |
| 5,226,957 | 7/1993 | Wickramanayake et al. | 106/25 R |
| 5,342,440 | 8/1994 | Wickramanayake | 106/22 R |
| 5,492,559 | 2/1996 | Oliver et al. | 106/22 E |
| 5,551,973 | 9/1996 | Oliver et al. | 106/22 E |
| 5,554,212 | 9/1996 | Bui et al. | 106/20 R |

OTHER PUBLICATIONS

Sporer, Kaler & Murthy "A Hot Melt Ink for Thermal Jet Printing" Journal of Imaging Science and Technology—vol. 36, #2 Mar./Apr. 1992 pp. 176–179.

Edited by H–F Eicke & G. D. Parfitt "Interfacial Phenomena in Apolar Media"/Stig E. Friberg—Stabilization of Inverse Micelles by Nonionic Surfactants pp. 93–116, no date available.

*Primary Examiner*—Helene Klemanski
*Attorney, Agent, or Firm*—Judith L. Byorick

[57] ABSTRACT

Disclosed is an ink composition which comprises water, an oil-soluble or alcohol-soluble dye, and a surfactant, said ink exhibiting a liquid microemulsion phase at a first temperature and, at a second temperature higher than the first temperature, separating into a mixture of an aqueous liquid phase and a liquid crystalline gel phase.

23 Claims, 6 Drawing Sheets

LIQUID CRYSTALLINE INK COMPOSITIONS

BACKGROUND OF THE INVENTION

The present invention is directed to ink compositions. More specifically, the present invention is directed to ink compositions particularly suitable for use in thermal ink jet printing processes. One embodiment of the present invention is directed to an ink composition which comprises water, an oil-soluble or alcohol-soluble dye, and a surfactant, said ink exhibiting a liquid microemulsion phase at a first temperature and, at a second temperature higher than the first temperature, separating into a mixture of an aqueous liquid phase and a liquid crystalline gel phase.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink, in excess of the normal boiling point, diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be retired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and 4,532,530, the disclosures of each of which are totally incorporated herein by reference.

Ink jet printing processes may also employ inks that are solid at room temperature and liquid at elevated temperatures. For example, U.S. Pat. No. 4,490,731, the disclosure of which is totally incorporated herein by reference, discloses an apparatus for dispensing solid ink for printing on a substrate such as paper. The ink dye vehicle is chosen to have a melting point above room temperature, so that the ink which is melted in the apparatus will not be subject to evaporation or spillage during periods of nonprinting. The vehicle is also chosen to have a low critical temperature to permit the use of the solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. Advantages of a hot melt ink in ink jet printing are elimination of potential spillage of the ink during handling, a wide range of print density and quality, minimal paper cockle or distortion, and enablement of indefinite periods of nonprinting without the danger of nozzle clogging, even without capping the nozzles.

In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with hot melt inks having an integrally connected ink jet head and reservoir system, the reservoir system including a highly efficient heat conducting plate inserted within an essentially non-heat conducting reservoir housing. The reservoir system has a sloping flow path between an inlet position and a sump from which ink is drawn to the head, and includes a plurality of vanes situated upon the plate for rapid heat transfer.

Ink compositions for ink jet printing are known. For example, U.S. Pat. No. 4,840,674 (Schwarz), the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 (Schwarz) and U.S. Pat. No. 5,122,187 (Marchessault et al.), the disclosures of each of which are totally incorporated herein by reference, disclose hot melt ink compositions suitable for ink jet printing which comprise a colorant, a binder, and a propellant selected from the group consisting of hydrazine; cyclic amines; ureas; carboxylic acids; sulfonic acids; aldehydes; ketones; hydrocarbons; esters; phenols; amides; imides; halocarbons; urethanes; ethers; sulfones; sulfamides; sulfonamides; phosphites; phosphonates; phosphates; alkyl sulfides; alkyl acetates; and sulfur dioxide. Also disclosed are hot melt ink compositions suitable for ink jet printing which comprise a colorant, a propellant, and a binder selected from the group consisting of rosin esters; polyamides; dimer acid amides; fatty acid amides; epoxy resins; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides; benzoate esters; long chain alcohols; phthalate plasticizers; citrate plasticizers; maleate plasticizers; sulfones; polyvinyl pyrrolidinone copolymers; polyvinyl pyrrolidone/polyvinyl acetate copolymers; novalac resins; natural product waxes; mixtures of linear primary alcohols and linear long chain amides; and mixtures of linear primary alcohols and fatty acid amides. In one embodiment, the binder comprises a liquid crystalline material.

U.S. Pat. No. 5,021,802 (Allred), the disclosure of which is totally incorporated herein by reference, discloses a bubble jet ink which comprises 90 to 99.9 percent by weight of aqueous sol-gel medium and 0.1 to 1 percent by weight colorant. The inks are thermally reversible sol-gels which are gels at ambient temperatures and form liquid sols at temperatures between about 40° and 100° C.

U.S. Pat. No. 5,041,161 (Cooke et al.), the disclosure of which is totally incorporated herein by reference, discloses an ink jet ink which is semi-solid at room temperature. The ink combines the advantageous properties of thermal phase change inks and liquid inks. The inks comprise vehicles, such as glyceryl esters, polyoxyethylene esters, waxes, fatty acids, and mixtures thereof, which are semi-solid at temperatures between 20° and 45° C. The ink is impulse jetted at an elevated temperature in the range of above 45° C. to about 110° C., at which temperature the ink has a viscosity of about 10 to 15 centipoise. The inks also contain 0.1 to 30 weight percent of a colorant system.

U.S. Pat. Nos. 4,853,036 and 5,124,718 disclose an ink for ink jet recording which comprises a liquid composition essentially comprising a coloring matter, a volatile solvent having a vapor pressure of 1 mm Hg or more at 25° C., and a material being solid at room temperature and having a molecular weight of 300 or more, and prepared so as to satisfy the formula $B_1/A_1 \geq 3$, assuming viscosity as $A_1$ cP at 25° C., measured when the content of the solid material in the composition is 10 percent by weight, and assuming viscosity as $B_1$ cP at 25° C., measured when the content of the solid material in the composition is 30 percent by weight. An ink jet recording process using the ink is also disclosed.

U.S. Pat. No. 5,065,167 (You et al.), the disclosure of which is totally incorporated herein by reference, discloses an ink jet ink including a waxy carrier that is solid at 25° C. and liquid at the operating temperature of an ink jet nozzle and a driver having a critical pressure greater than 10 atmospheres, the carrier and driver being miscible in liquid phase.

U.S. Pat. No. 5,047,084 (Miller et al.), the disclosure of which is totally incorporated herein by reference, discloses an ink jet ink in the form of a microemulsion of an organic vehicle phase comprising fatty acid and colorant dispersed therein and an aqueous phase containing a surfactant, the vehicle phase preferably being liquid at 70° C. and solid at 20° C.

U.S. Pat. No. 5,226,957 (Wickramanayake et al.), the disclosure of which is totally incorporated herein by reference, discloses water insoluble dyes formulated in a microemulsion-based ink which is waterfast, non-threading, and bleed-alleviated. The inks comprise (a) about 0.05 to 0.75 weight percent of a high molecular weight colloid, (b) about 0.1 to 40 weight percent of at least two surfactants, comprising at least one surfactant and at least one co-surfactant, (c) about 0.5 to 20 weight percent of at least one cosolvent, (d) about 0.1 to 5 weight percent of at least one water insoluble dye, (e) about 0.1 to 20 weight percent of an oil, and (f) the balance water. The ink forms a stable microemulsion.

"Stabilization of Inverse Micelles by Nonionic Surfactants," Stig E. Friberg, contained in *Interfacial Phenomena in Apolar Media*, Eicke & Parfitt, eds., Marcel Dekker Inc. (New York and Basel 1987), the disclosure of which is totally incorporated herein by reference, discloses and describes systems with hydrocarbon, water, and nonionic polyalkylene glycol alkyl ether surfactants which display pronounced variation of their phase patterns with temperature. At particular temperatures and component concentrations, a lamellar liquid crystalline phase is observed.

"A Hot Melt Ink for Thermal Jet Printing," A. H. Sporer et al., Journal of Imaging Science and Technology, Vol. 36, No. 2, p. 176 (March/April 1992), the disclosure of which is totally incorporated herein by reference, discloses an ink technology wherein the fluid vehicle of the ink is a stable, single-phase, water-in-oil (wax) microemulsion at elevated temperatures in the range of 70° to 95° C., yet is a solid at ambient temperatures. The ink, because it is a microemulsion, is stable to freeze-melt cycles. The ink is suitable for jetting as a hot melt ink in conventional continuous or impulse ink jet apparatus, and can also operate in impulse thermal ink jet printheads where other hot melt ink jet ink compositions cannot.

Copending application U.S. Ser. No. 08/325,762, now U.S. Pat. No. 5,492,559, filed Oct. 19, 1994, entitled "Liquid Crystalline Microemulsion Ink Compositions," with the named inventors John F. Oliver, Marcel P. Breton, Stig E. Friberg, Raymond W. Wong, and William M. Schwarz, the disclosure of which is totally incorporated herein by reference.

Copending application U.S. Ser. No. 08/325,914, filed Oct. 19, 1994, entitled "Coated Recording Sheets," with the named inventor William M. Schwarz, the disclosure of which is totally incorporated herein by reference, discloses a recording sheet which comprises a substrate and a coating thereon comprising water and a surfactant capable of exhibiting a liquid crystalline phase in water at a temperature of about 25° C. or higher, said coating containing the water and surfactant in relative concentrations such that upon addition of water to the coating, the surfactant undergoes a phase change, thereby increasing the viscosity of the coating. In one embodiment, the surfactant is in a lamellar liquid crystalline phase and, upon addition of water to the coating, the surfactant undergoes a phase change to a hexagonal liquid crystalline phase. Also disclosed are ink jet printing processes wherein an aqueous ink is applied to the aforementioned recording sheet.

While known compositions and processes are suitable for their intended purposes, a need remains for ink compositions suitable for thermal ink jet printing. In addition, there is a need for ink compositions which are compatible with a wide variety of plain papers. Further, there is a need for ink compositions which generate high quality, waterfast images on plain papers. There is also a need for ink jet ink compositions which generate high quality, fast-drying images on a wide variety of plain papers at low cost, with high quality text and high quality graphics. Further, there is a need for ink jet ink compositions which exhibit minimal feathering. Additionally, there is a need for ink jet ink compositions which exhibit minimal intercolor bleed. There is also a need for ink jet ink compositions which exhibit excellent image permanence. Further, there is a need for ink jet ink compositions which are suitable for use in acoustic ink jet printing processes. Additionally, there is a need for ink compositions suitable for ink jet printing processes wherein the substrate is heated prior to printing and is cooled to ambient temperature subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate subsequent to printing is minimized. Further, a need remains for ink compositions which have a high water content and are thus environmentally friendly. Additionally, there is a need for ink compositions which have a high water content and contain no organic solvent, and are thus environmentally friendly.

SUMMARY OF THE INVENTION

It is an object of the present invention to provide an ink composition with the above noted advantages.

It is another object of the present invention to provide ink compositions suitable for thermal ink jet printing.

It is yet another object of the present invention to provide ink compositions which are compatible with a wide variety of plain papers.

It is still another object of the present invention to provide ink compositions which generate high quality, waterfast images on plain papers.

Another object of the present invention is to provide ink jet ink compositions which generate high quality, fast-drying images on a wide variety of plain papers at low cost, with high quality text and high quality graphics.

Yet another object of the present invention is to provide ink jet ink compositions which exhibit minimal feathering.

Still another object of the present invention is to provide ink jet ink compositions which exhibit minimal intercolor bleed.

It is another object of the present invention to provide ink jet ink compositions which exhibit excellent image permanence.

It is yet another object of the present invention to provide ink jet ink compositions which are suitable for use in acoustic ink jet printing processes.

It is still another object of the present invention to provide ink compositions suitable for ink jet printing processes wherein the substrate is heated prior to printing and is cooled to ambient temperature subsequent to printing (also known as heat and delay printing processes).

Another object of the present invention is to provide ink compositions suitable for ink jet printing wherein high optical densities can be achieved with relatively low dye concentrations.

Yet another object of the present invention is to provide ink compositions suitable for ink jet printing wherein curling of the substrate subsequent to printing is minimized.

Still another object of the present invention is to provide ink compositions which have a high water content and are thus environmentally friendly.

It is another object of the present invention to provide ink compositions which have a high water content and contain no organic solvent, and are thus environmentally friendly.

These and other objects of the present invention (or specific embodiments thereof) can be achieved by providing an ink composition which comprises water, an oil-soluble or alcohol-soluble dye, and a surfactant, said ink exhibiting a liquid microemulsion phase at a first temperature and, at a second temperature higher than the first temperature, separating into a mixture of an aqueous liquid phase and a liquid crystalline gel phase.

BRIEF DESCRIPTION OF THE DRAWINGS

Illustrated schematically in FIG. 2 is a partial phase diagram for a mixture of water, Brij 58 surfactant, and octyl alcohol.

Illustrated schematically in FIG. 3 is a partial phase diagram for a mixture of water, Brij 98 surfactant, and octyl alcohol.

Illustrated schematically in FIG. 4 is a partial phase diagram for a mixture of water, Brij 78 surfactant, and octyl alcohol.

Illustrated schematically in FIG. 5 is a partial phase diagram for a mixture of water, Tergitol 15-s-9 surfactant, and octyl alcohol.

Illustrated schematically in FIG. 6 is a partial phase diagram for a mixture of water, Tergitol 15-s-20 surfactant, and octyl alcohol.

DETAILED DESCRIPTION OF THE INVENTION

The ink compositions of the present invention comprise water, an oil-soluble or alcohol-soluble dye, and a surfactant. Water is present in the ink in any effective amount to enable formation of an aqueous micellar solution of the dye, and to enable bubble formation in a thermal ink jet printing process. Typically, water is present in the ink in an amount of from about 50 to about 90 percent by weight, although the amount can be outside this range.

The inks of the present invention optionally may also contain a cosolvent or organic component, which can be selected so that the resulting ink exhibits the desired viscosity and surface tension properties which are most compatible with the operability of the particular printhead to be used and the particular substrate onto which the ink will be jetted. If present, the optional cosolvent or organic component must also be selected so that the resulting ink composition exhibits a liquid microemulsion phase at a first temperature and, at a second temperature higher than the first temperature, separates into a mixture of an aqueous liquid phase and a liquid crystalline gel phase. Examples of suitable optional cosolvents include alcohols, such as octanol and the like, glycol ethers, carboxylic acids, such as decanoic acid and the like, amines, such as decylamine and the like, and the like. While solvents with boiling points of less than about 80° C. are suitable, solvents which boil at higher temperatures are also suitable, including those with boiling points of over 80° C., and those with boiling points of over 100° C., such as sulfolane, cyclohexanone, 2-pentanol, cyclohexylpyrrolidone, and the like. Typically, the cosolvent or organic component is present in the ink in an amount of from 0 to about 50 percent by weight, preferably from about 0 to about 20 percent by weight, although the amount can be outside these ranges.

The inks of the present invention can also, if desired, contain an optional cosurfactant. The cosurfactant preferably is an alcohol, which preferably (although not necessarily) is a linear alcohol. In this embodiment, the alcohol preferably has from about 4 to about 12 carbon atoms, more preferably from about 6 to about 10 carbon atoms, and even more preferably from about 8 to about 10 carbon atoms, although the number of carbon atoms can be outside these ranges. The alcohol can have one hydroxyl group or more than one hydroxyl group. Specific examples of preferred alcohols for this embodiment include 1-propanol, 1-butanol, 1-pentanol, 1-hexanol, 1-heptanol, 1-octanol, 1-nonanol, 1-decanol, 1-undecanol, 1-dodecanol, 1,2-pentanediol, 1,2-hexanediol, 1,2-heptanediol, 1,2-octanediol, 1,2-nonanediol, 1,2-decanediol, 1,2-undecanediol, 1,2-dodecanediol, and the like, as well as mixtures thereof. Alcohols may be particularly preferred cosurfactants for the ink composition when the selected surfactant exhibits a cloud point which is otherwise undesirably high (for example, above about 80° C.) but which is lowered to a desirable level (such as, for example, about 40° C. or lower) when present in combination with the alcohol; in this embodiment, the surfactant and alcohol preferably are present in relative amounts of from about 1 part by weight alcohol and about 5 parts by weight surfactant to about 10 parts by weight alcohol and about 20 parts by weight surfactant, although the relative amounts can be outside these ranges. Typically, the cosurfactant is present in the ink in an amount of from 0 to about 50 percent by weight, preferably from 0 to about 20 percent by weight, more preferably from about 2 to about 10 percent by weight, and even more preferably from about 4 to about 8 percent by weight, although the amount can be outside these ranges.

Inks of the present invention also contain an oil soluble or alcohol soluble dye. The dye is selected so that it is easily soluble in the ink solution but relatively insoluble in water. For example, one dye suitable for the present invention, Solvent Red 119, has solubilities of about 0.35 grams per milliliter in benzyl alcohol, about 0.2 grams per milliliter in methyl ethyl ketone, about 3 milligrams per milliliter in ethanol, and less than about 0.1 milligram per milliliter in water. Another suitable dye, Solvent Blue 37, is somewhat more soluble in water. The dye is present in the ink in any effective amount. Typically, the dye is present in the ink in an amount of from about 0.01 to about 10 percent by weight, preferably from about 0.05 to about 4 percent by weight, and more preferably from about 0.1 to about 3 percent by weight, although the amount can be outside these ranges. Examples of suitable oil soluble or spirit soluble dyes include Resorcin Crystal Violet, Orasol Black RL or Intraplast Black RL/Solvent Black 29, Lapranol Black BR, Savinyl Black RLS, Orasol Black RLP, Neozapon Black X57; solvent yellow dyes inclusive of Savinyl Yellow 2 RLS, Savinyl Yellow RLSN, Intraplast Yellow 2GLN, Neozapon Yellow 081, Neozapon Yellow 141, Levaderm Lemon Yellow, Zapon Fast Yellow CGR, Aizen Fast Yellow CGNH, Zapon Yellow 100, Zapon Yellow 157, and Savinyl Yellow RLS; magenta dyes such as Neozapon Red 492, Direct Brilliant Pink B, Savinyl Pink 6 BLS, Savinyl Red 3 BLS, Orasol Red 2 BL, Intraplast Red G (Orasol Red), Savinyl Red BLSN, Savinyl Scarlet RLS, Savinyl Fire Red 3GLS, and Zapon Red 335; cyan dyes Orasol Blue 2 GLN, Neozapon Blue 807, Savinyl Blue RLS, Savinyl Blue GLS, Orasol Blue GN, and Losol Blue; brown dyes inclusive of Zapon Brown 187 and Savinyl Brown GLS, Solvent Green 3, Sudan Black B, Ceres Blue 2V, Liquid Oil Jet Black, Macrolex Red G Gram, Macrolex Yellow 3G, Victoria Blue R, available from Bayer AG, Leverkusen, Germany, Morfast Blue 100, Morfast Red 104, and Morfast Red 100, available from Morton International Specialty Chemicals Group, Chicago, Ill.; and mixtures thereof; and the like, as well as mixtures thereof.

Ink compositions of the present invention also contain one or more surfactants or cosurfactants capable of imparting to the aqueous micellar solution a liquid crystalline structure at a temperature above ambient temperatures (i.e., above about 25° C., preferably at temperatures of from about 30° to about 140° C., and more preferably from about 40° to about 80° C., although the temperature can be outside these ranges). The surfactant or mixture of surfactants is present in any effective amount to enable formation of a liquid crystalline emulsion between the water and organic component in the ink at the desired temperature. Typically, the surfactant or mixture of surfactants is present in the ink in an amount of from about 2 to about 30 percent by weight, preferably from about 5 to about 20 percent by weight, although the amount can be outside these ranges.

Preferred surfactants generally are nonionic surfactants, which may also be combined with small amounts (i.e., typically less than about 10 percent) of ionic surfactants. Particularly preferred surfactants are oligoethyleneglycol alkyl ethers and oligoethyleneglycol fluorinated alkyl ethers. Examples of suitable surfactants include those of the general formula wherein n is an integer of from about 5 to about 20, and preferably from about 6 to about 20, and x is an integer of from about 5 to about 30, and preferably from about 8 to about 12, such as wherein n is 8 or 9, available as Triton X-100 (HLB=13.5) from Rohm & Haas Co., Philadelphia, Pa., the Igepal surfactants available from Rhone-Poulenc, Cranbury, N.J., GAF Corporation Chemical Products, Wayne, N.J., and BASF, such as wherein x is 7 or 8, available as Igepal CO-610 (HLB=12.2), available as Igepal CO-520 (HLB=10.0), available as Igepal CO-620 (HLB=12.6), available as Igepal CO-630 (HLB=13.0), available as Igepal CO-660 (HLB=13.2), and the like; surfactants of the general formula $R(OCH_2CH_2)_nOH$ wherein R is a linear hydrocarbon chain or fluorinated hydrocarbon chain with from about 6 to about 20 carbon atoms and n represents the number of repeating units and is an integer of from about 5 to about 30, and preferably from about 8 to about 18, such as polyoxyethylene (20) stearyl ether, wherein R is $C_{18}H_{37}$ and n is 20 (Brij 78, HLB=15.3, available from ICI Americas, Inc., Wilmington, Del.), polyoxyethylene (20) cetyl ether, wherein R is $C_{16}H_{33}$ and n is 20 (Brij 58, HLB=15.7, available from ICI), polyoxyethylene (10) oleyl ether, wherein R is $CH_3(CH_2)_7CH=CH(CH_2)_7CH_2$ and n is 10 (Brij 97, HLB=12.4, available from ICI), polyoxyethylene (20) oleyl ether, wherein R is $CH_3(CH_2)_7CH=CH(CH_2)_7CH_2$ and n is 12 (Brij 98, HLB=15.3, available from ICI), polyoxyethylene (23) lauryl ether, wherein R is 12 and n is 23 (Brij 35, HLB=16.9), and the like; ethoxylated alcohols such as the Ethal series of surfactants, such as an ethoxylated dinonyl phenol (Ethal DNP-18, HLB=13.8, available from Ethox Chemicals Inc., Greenville, S.C.), an ethoxylated linear alcohol (Ethal LA-7, HLB=11.8, available from Ethox Chemicals), and the like; the Tergitol S series of surfactants, of the general formula $C_xH_yO(CH_2CH_2O)_zH$, wherein x is an integer of from about 11 to about 15, y is an integer of from about 23 to about 31, and z is an integer of from about 9 to about 20, such as $C_{15}H_{31}O(CH_2CH_2O)_9H$, available as Tergitol 15-s-9 (HLB= 13.3) from Union Carbide, Danbury, Conn., $C_{15}H_{31}O(CH_2CH_2O)_{15}H$, available as Tergitol 15-s-15 (HLB=15.4) from Union Carbide, Danbury, Conn., $C_{15}H_{31}O(CH_2CH_2O)_{20}H$, available as Tergitol 15-s-20 (HLB=16.3) from Union Carbide, Danbury, Conn.; and the like, as well as mixtures thereof. Preferred surfactants have an HLB value of from about 8 to about 18, and preferably from about 11 to about 17, although the HLB value can be outside these ranges.

Other optional additives to the inks include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The inks of the present invention are characterized by their ability to exhibit a liquid crystalline gel structure at certain temperatures and a liquid microemulsion structure at other, lower temperatures. At a first temperature, they exist as pure liquid microemulsions. At a second temperature, higher than the first temperature, they exist as a two-phase composition of (a) an aqueous phase containing water and only insignificant amounts of surfactant and dye, and (b) a solid-like liquid crystalline gel. The ink thus remains in a well defined spot while the water without dye is absorbed into the substrate onto which the ink is printed. In each instance, the transition from one phase to another upon heating or cooling is relatively sharp, in that it occurs rapidly within a narrow temperature range. The inks pass reversibly through these phase changes. Thus, for an ink existing in the pure liquid microemulsion form at about 25° C. and in the two-phase form (aqueous phase and lamellar liquid crystalline phase) at about 60° C., the ink in pure liquid form can be jetted onto a substrate heated to a temperature of about 80° C., and, as it contacts the heated substrate, it passes into the aqueous/lamellar liquid crystalline form. Thus, because upon being heated the ink rapidly separates into a very viscous liquid crystalline phase containing almost all of the dye and water containing only insignificant amounts of dye, capillary action of the ink in the paper is retarded and high definition images are formed even on plain paper. In contrast to other phase change ink concepts, the inks of the present invention upon jetting momentarily remain sufficiently fluid to be partially absorbed into the paper. As a result, the images dry rapidly, show no raised braille-like character, are resistant to surface abrasion, and exhibit good fix.

Figure 1:
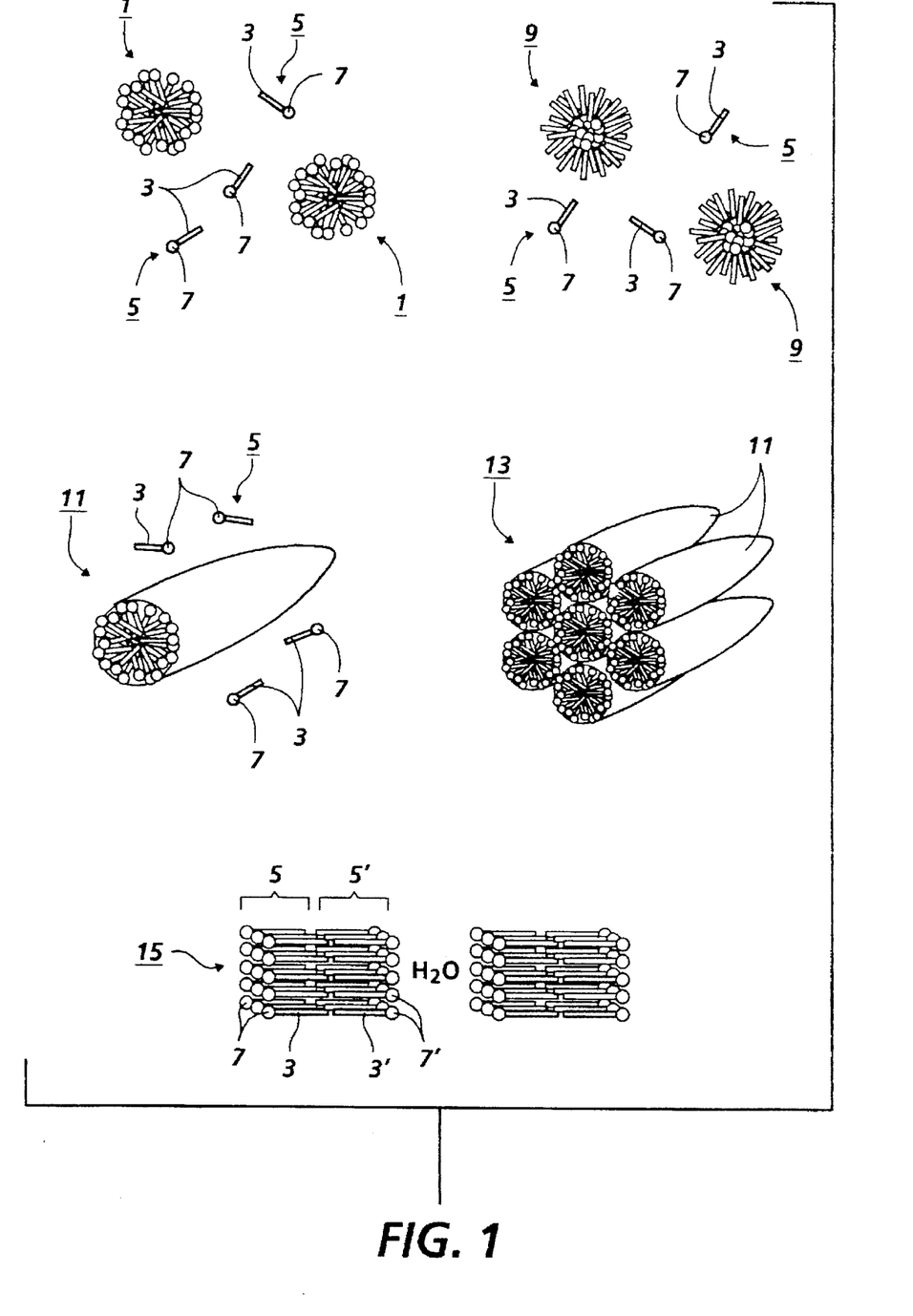
FIG. 1 illustrates schematically the various phase forms observed in an ink composition of the present invention.

As illustrated schematically in FIG. 1, surfactant molecules suitable for the present invention, in a solvent such as water, assume various different configurations. For example, spherical micelles 1 form in a polar solvent when the nonpolar ends 3 of several surfactant molecules 5 cluster together, with polar ends 7 of the surfactant molecules radiating outward. At particularly high concentrations of surfactant, "inverted" micelles 9 may also form, wherein the nonpolar ends 3 radiate outward and the polar ends 7 cluster together. Under other concentration and temperature conditions, rod micelles 11 may form in a polar solvent, wherein the nonpolar ends 3 of several surfactant molecules 5 cluster together, with polar ends 7 of the surfactant molecules radiating outward, and wherein the micelle takes on a cylindrical shape. Under still other concentration and temperature conditions, the surfactant molecules in a polar solvent may assume a hexagonal liquid crystalline phase 13, wherein several rod micelles 11 pack together in a hexagonal formation. Under yet other concentration and temperature conditions, the surfactant molecules in a polar solvent may assume a lamellar liquid crystalline phase 15, in which one row surfactant molecules 5 align with polar ends 7 and nonpolar ends 3 each facing in a single direction, and wherein another row of surfactant molecules 5' forms directly adjacent to the first row, with polar ends 7' facing in the direction opposite to that taken by polar ends 7 and nonpolar ends 3' facing nonpolar ends 3. The configuration or phase assumed by the surfactant molecules in the solvent is a function of the temperature and of the concentration of surfactant molecules in the solvent.

While not being limited to any particular theory, it is believed that the dye colorant in the inks of the present invention becomes trapped or retained within the lamellar liquid crystalline structure of the ink at elevated temperatures. Thus, most or all of the dye is retained within the liquid crystalline structure at the temperature of the substrate onto which the ink is jetted, leaving non-colored water to penetrate the substrate. Since the oil soluble dye is localized to the liquid crystalline phase, the water is left with faint or no color, and the water is accordingly free to penetrate the substrate causing no coloration, while the dye remains in the liquid crystalline phase, which does not spread. Intercolor bleed, showthrough, and feathering can thus be reduced.

The behavior of ink compositions of the present invention is further illustrated by the partial phase diagrams in FIGS. 2 through 6. More specifically, the partial phase diagrams illustrated in FIGS. 2 through 6 illustrate the effect of temperature on an ink vehicle comprising water, octyl alcohol, and a surfactant. In each instance, the ratio of alcohol to surfactant remains constant and the amount of the alcohol/surfactant in the vehicle is indicated along the X-axis. Thus, when x=0, the vehicle is 100 percent water and when x=100, the vehicle is 100 percent of the alcohol/surfactant mixture.

Figure 2:
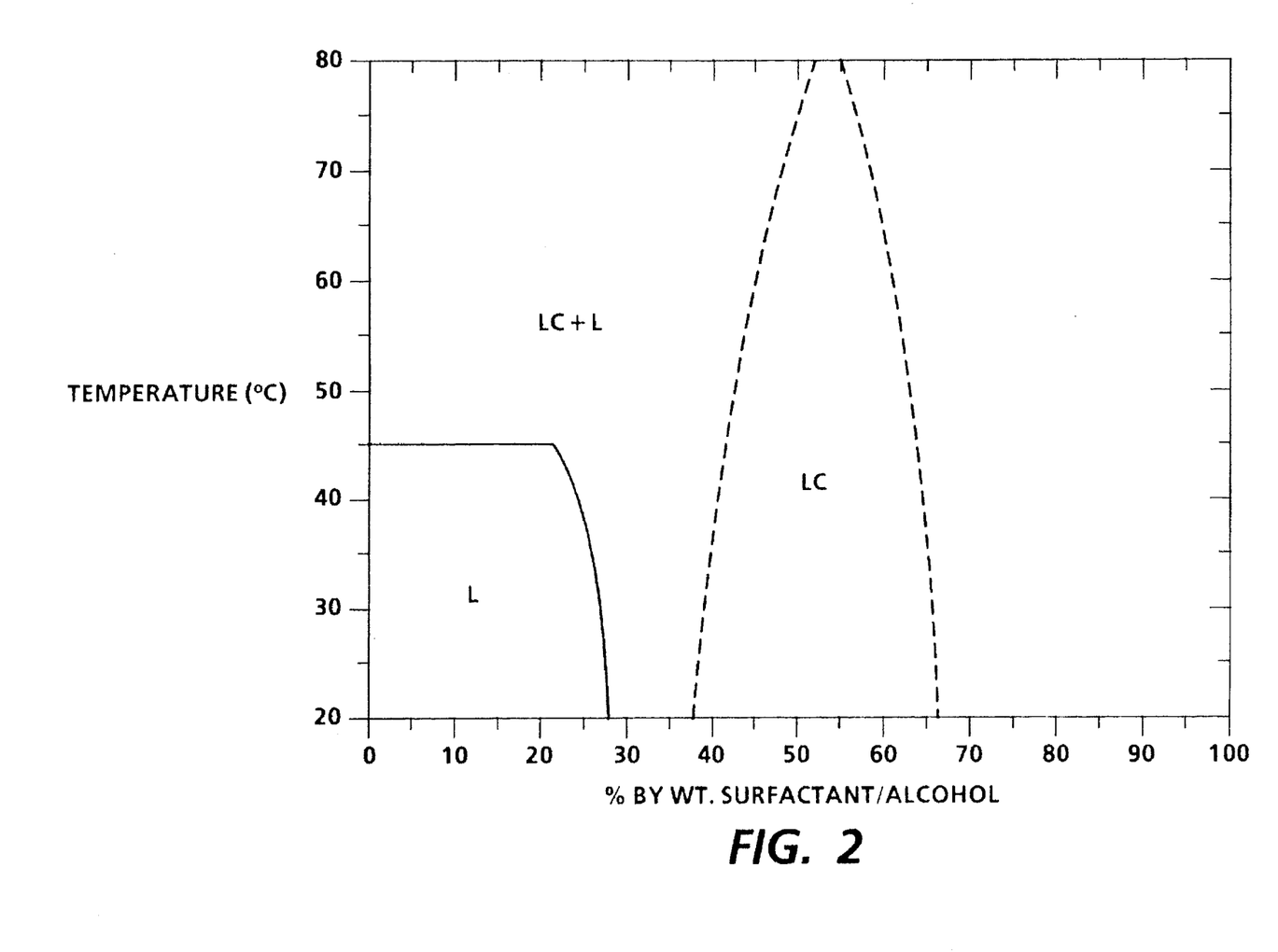

As illustrated in FIG. 2, the ink vehicle comprises water, octyl alcohol, and Brij 58 surfactant. The ratio of surfactant to alcohol remains constant at 7.6 parts by weight surfactant and 2.4 parts by weight alcohol. As the diagram indicates, at surfactant/alcohol mixture contents of less than about 28 percent by weight, the vehicle is a liquid microemulsion (L) at room temperature, and separates into two phases, an aqueous phase and a liquid crystalline phase (L+LC) at temperatures above about 45° C. At room temperature, the surfactant is soluble in water, forming a micellar solution in which one can solubilize a colorant. Above 45° C., the solution is divided into water and a lamellar liquid crystalline phase. The relative amounts of water and lamellar liquid crystal depends on the surfactant concentration in the original solution.

Figure 3:
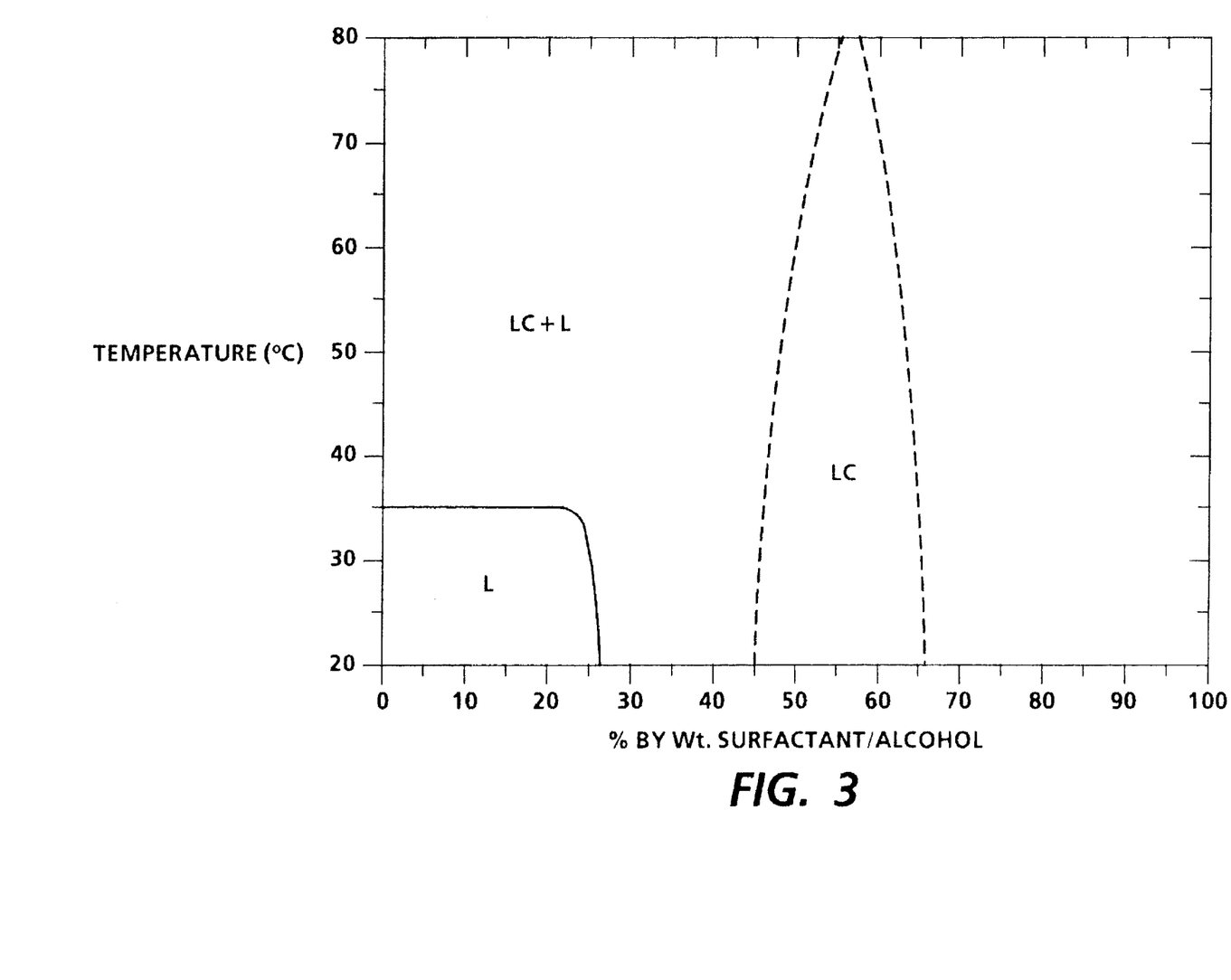

As illustrated in FIG. 3, the ink vehicle comprises water, octyl alcohol, and Brij 98 surfactant. The ratio of surfactant to alcohol remains constant at 8.3 parts by weight surfactant and 1.9 parts by weight alcohol. As the diagram indicates, at surfactant/alcohol mixture contents of less than about 26 percent by weight, the vehicle is a liquid microemulsion (L) at room temperature, and separates into two phases, an aqueous phase and a liquid crystalline phase (L+LC) at temperatures above about 35° C.

Figure 4:
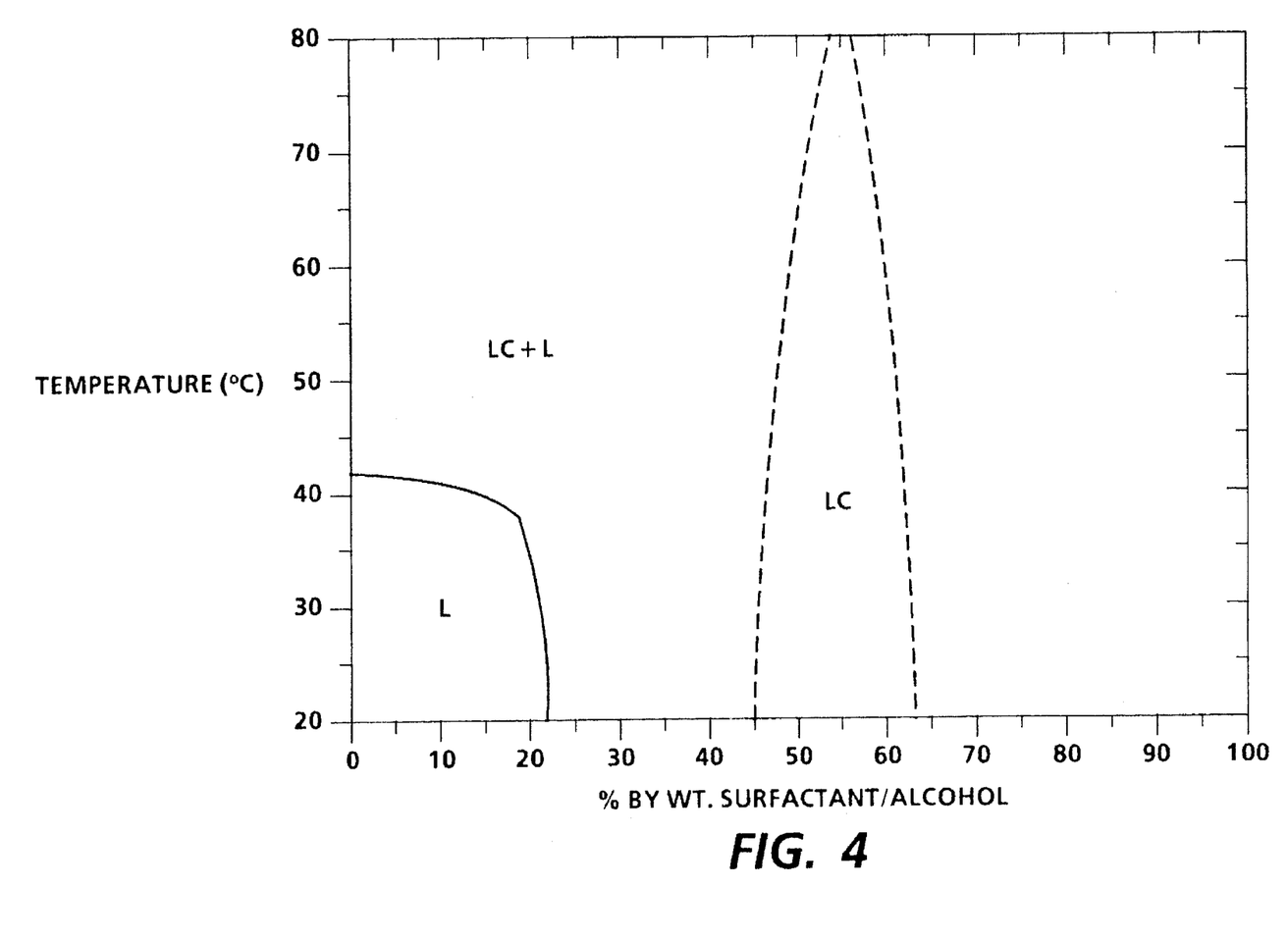

As illustrated in FIG. 4, the ink vehicle comprises water, octyl alcohol, and Brij 78 surfactant. The ratio of surfactant to alcohol remains constant at 14.5 parts by weight surfactant and 4.3 parts by weight alcohol. As the diagram indicates, at surfactant/alcohol mixture contents of less than about 22 percent by weight, the vehicle is a liquid microemulsion (L) at room temperature, and separates into two phases, an aqueous phase and a liquid crystalline phase (L+LC) at temperatures above about 42° C.

Figure 5:
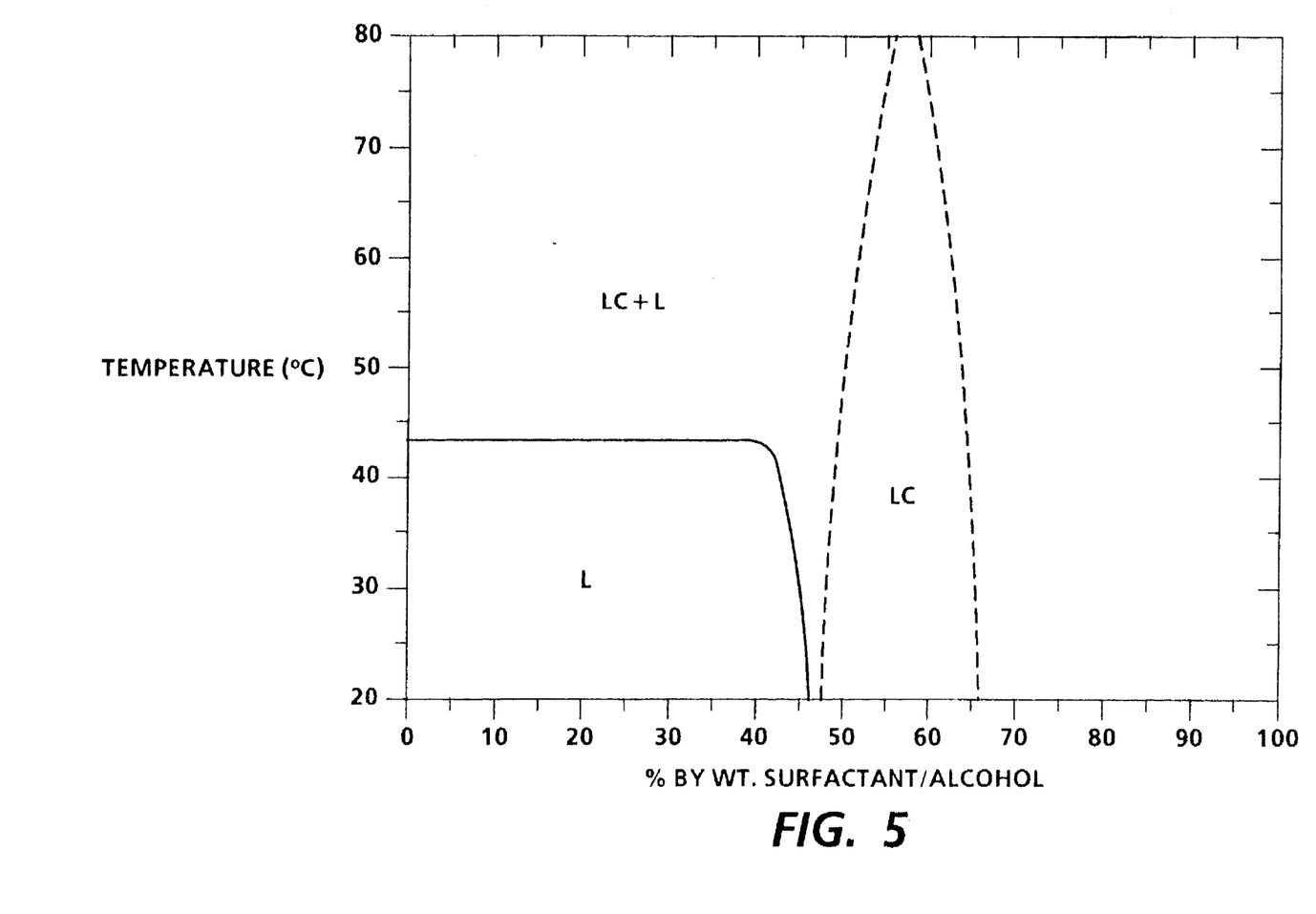

As illustrated in FIG. 5, the ink vehicle comprises water, octyl alcohol, and Tergitol 15-s-9 surfactant. The ratio of surfactant to alcohol remains constant at 10 parts by weight surfactant and 1 part by weight alcohol. As the diagram indicates, at surfactant/alcohol mixture contents of less than about 46 percent by weight, the vehicle is a liquid microemulsion (L) at room temperature, and separates into two phases, an aqueous phase and a liquid crystalline phase (L+LC) at temperatures above about 43° C.

Figure 6:
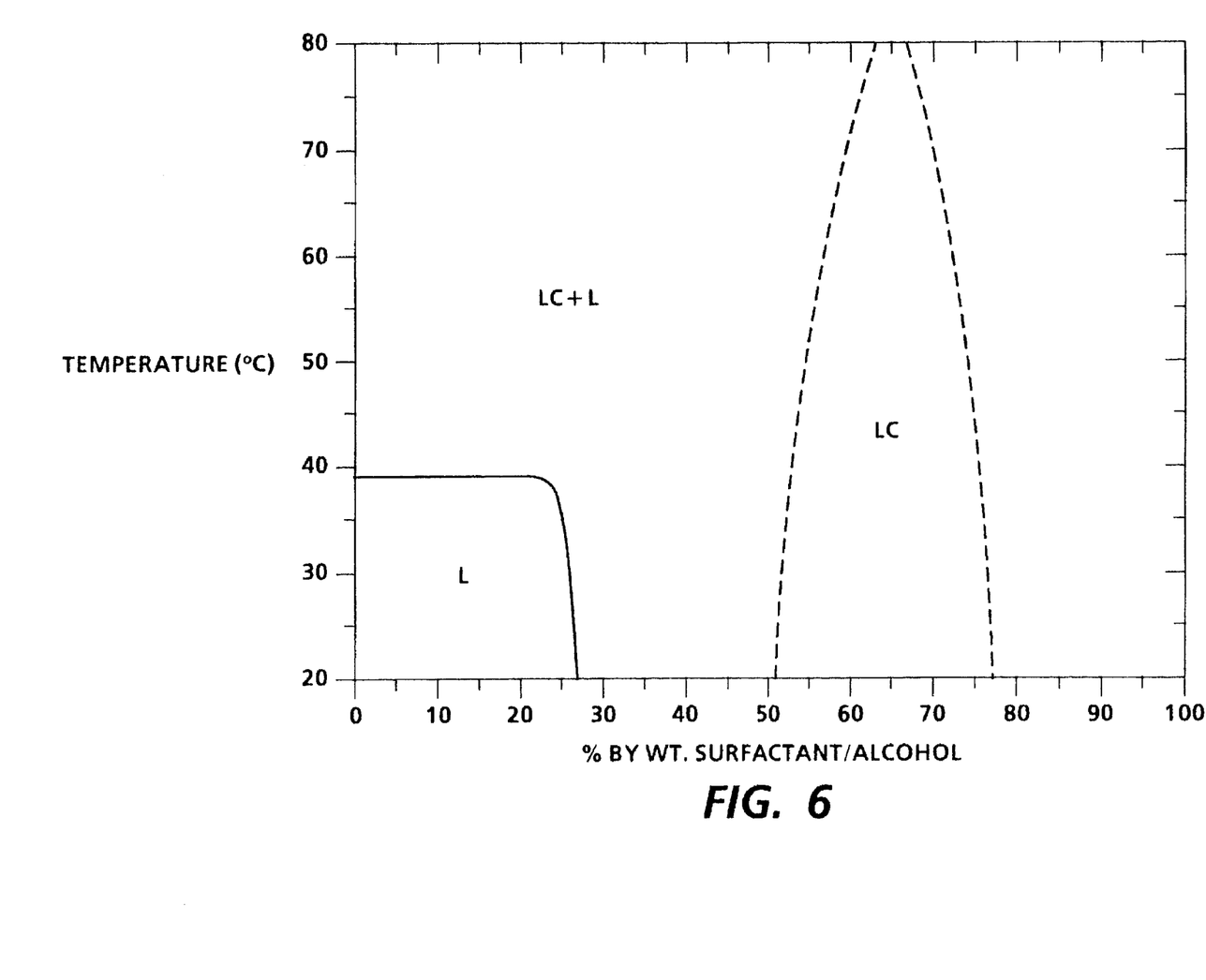

As illustrated in FIG. 6, the ink vehicle comprises water, octyl alcohol, and Tergitol 15-s-20 surfactant. The ratio of surfactant to alcohol remains constant at 10 parts by weight surfactant and 4 parts by weight alcohol. As the diagram indicates, at surfactant/alcohol mixture contents of less than about 27 percent by weight, the vehicle is a liquid microemulsion (L) at room temperature, and separates into two phases, an aqueous phase and a liquid crystalline phase (L+LC) at temperatures above about 39° C.

Each specific combination of ink vehicle ingredients will exhibit a different partial phase diagram, which can be plotted by observing the variations in phase at various ingredient concentrations and at various temperatures. These phase diagrams are known in the art and are demonstrated in more detail in, for example, "Stabilization of Inverse Micelles by Nonionic Surfactants," Stig E. Friberg, contained in Interfacial Phenomena in Apolar Media, Eicke & Parfitt, eds., Marcel Dekker Inc. (New York and Basel 1987), the disclosure of which is totally incorporated herein by reference.

The inks of the present invention are particularly suitable for printing processes wherein the substrate, such as paper, transparency material, or the like, is heated during the printing process to facilitate formation of the liquid crystalline phase within the ink. Preferably, the substrate is heated to the highest temperature possible to enable the most rapid possible ink drying without damaging the substrate. When transparency substrates are employed, temperatures typically are limited to a maximum of about 100° to 110° C., since the polyester typically employed as the base sheet in transparency sheets tends to deform at higher temperatures. Specially formulated transparencies and paper substrates can, however, tolerate higher temperatures, frequently being suitable for exposure to temperatures of 150° or even 200° C. in some instances. Typical heating temperatures are from about 40° to about 140° C., and preferably from about 60° to about 95° C., although the temperature can be outside these ranges.

Inks of the present invention are distinct from inks which contain liquid crystalline molecules or components in that no single ink component, standing alone, exhibits liquid crystalline behavior. Rather, the combination of ink components exhibits liquid crystalline behavior upon heating and cooling.

Inks of the present invention typically exist within a specific temperature window in the pure liquid or liquid microemulsion phase, typically at temperatures of about 30° C. and below, and preferably at temperatures of about 40° C. and below, although the temperature at which the pure liquid or liquid microemulsion forms can be outside these ranges. Inks of the present invention typically form two phases, an aqueous liquid phase and a liquid crystalline phase (i.e., lamellar, hexagonal, or the like), at temperatures typically of from about 30° to about 90° C., and preferably from about 40° to about 80° C., although the temperature at which this two-phase mixture of aqueous liquid and liquid crystalline gel forms can be outside these ranges.

While in the two-phase aqueous liquid/liquid crystalline gel form, the liquid crystalline gel forms of the inks of the present invention typically have viscosities of several hundred milliPascal-seconds or more. While at lower temperatures (preferably about 40° C. or less) in the liquid microemulsion form, inks of the present invention typically have viscosities of from about 3 to about 12 milliPascal-seconds, although the viscosity in the liquid microemulsion form can be outside this range.

Typically, inks of the present invention are converted from Phase A, which is the pure liquid microemulsion phase (L), to Phase B, which is the two-phase aqueous liquid/ liquid crystalline gel phase (L+LC), over a relatively narrow temperature range; typically the temperature range for this transition is about 2° C. or less, more typically about 1° C. or less, and preferably about 0.5° C. or less, although the transition range can be broader than these ranges.

Inks of the present invention can be prepared by any suitable method. For example, the inks can be prepared by gently stirring or shaking the individual components of the aqueous, surfactant, and organic solvent phases in an appropriate container. Typically, the dye is admixed with non-aqueous components first, followed by admixing all of the other ingredients with the organic component/dye mixture, and agitating or stirring the components.

Printed images may be generated with the inks of the present invention by incorporating the inks into an ink jet printer and causing droplets of the ink to be ejected in imagewise pattern onto a substrate such as paper or transparency material which has been heated to a temperature at which the liquid crystalline gel or solid phase forms in the ink. Suitable printers for employing the inks of the present invention include commercially available ink jet printers, such as the Hewlett-Packard Company 1200C, 550C, 1600C, and 850C printers. Conventional thermal ink jet printers may be modified to make them suitable for use with inks of the present invention by including a heater for heating the receiving substrate (such as paper, transparency material, or the like) to the temperature at or above which the ink separates into an aqueous liquid phase and a liquid crystalline gel phase. The inks can also be employed in processes wherein the ink is jetted onto a heated intermediate, followed by transfer of the image from the intermediate to a substrate. The inks of the present invention are also suitable for use in piezoelectric drop-on-demand ink jet printing systems and in continuous stream ink jet printing systems. Any suitable substrate can be employed, including plain papers such as Xerox 4024 papers, ruled notebook paper, bond paper, silica coated papers such as Sharp Company silica coated paper, Jujo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Inks of the present invention are particularly suitable for use in acoustic ink jet printing processes. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," IBM Technical Disclosure Bulletin, Vol 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations; including (1) single ejector embodiments for raster scan printing, (2) matrix configured ejector arrays for matrix printing, and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. Nos. 4,308,547, 4,697, 195, 5,028,937, 5,041,849, 4,751,529, 4,751,530, 4,751,534, 4,801,953, and 4,797,693, the disclosures of each of which are totally incorporated herein by reference. The use of focused acoustic beams to eject droplets of controlled diameter and velocity from a free-liquid surface is also described in J. Appl. Phys., vol. 65, no. 9 (1 May 1989) and references therein, the disclosure of which is totally incorporated herein by reference.

One embodiment of the present invention is directed to a process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising water, an oil-soluble or alcohol-soluble dye, and a surfactant, said ink exhibiting a liquid microemulsion phase at a first temperature and, at a second temperature higher than the first temperature, separating into a mixture of an aqueous liquid phase and a liquid crystalline gel phase; and (b) causing droplets of said ink to be ejected onto a recording sheet in an imagewise pattern.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Ink compositions of the present invention with the following ingredients were prepared by simple mixing of the ingredients at room temperature:

A. 11.7 parts by weight Brij 98 surfactant (obtained from ICI Americas, Wilmington, Del.); 84.5 parts by weight deionized water; 3.7 parts by weight 1-octanol (obtained from Aldrich Chemical Co., Milwaukee, Wis.); and 0.15 parts by weight Morfast Blue 100 dye (obtained from Morton International Specialty Chemicals Group, Chicago, Ill.). Characteristics at ambient temperature (about 25° C.): viscosity: 4.8 centipoise; surface tension: 29 dynes per square centimeter.

B. 11.7 parts by weight Brij 98 surfactant (obtained from ICI Americas, Wilmington, Del.); 84.5 parts by weight deionized water; 3.7 parts by weight 1-octanol (obtained from Aldrich Chemical Co.); and 0.15 parts by weight Morfast Red 100 dye (obtained from Morton International Specialty Chemicals Group, Chicago, Ill.). Characteristics at ambient temperature (about 25° C.): viscosity: 4.8 centipoise; surface tension: 29 dynes per square centimeter.

C. 11.3 parts by weight Brij 58 surfactant (obtained from ICI Americas, Wilmington, Del.); 84.7 parts by weight deionized water; 3.9 parts by weight 1-octanol (obtained from Aldrich Chemical Co.); and 0.15 parts by weight Morfast Blue 100 dye (obtained from Morton International Specialty Chemicals Group, Chicago, Ill.). Characteristics at ambient temperature (about 25° C.): viscosity: 4.9 centipoise; surface tension: 28 dynes per square centimeter.

D. 11.3 parts by weight Brij 58 surfactant (obtained from ICI Americas, Wilmington, Del.); 84.5 parts by weight deionized water; 3.9 parts by weight 1-octanol (obtained from Aldrich Chemical Co.); and 0.21 parts by weight Morfast Blue 100 dye (obtained from Morton International Specialty Chemicals Group, Chicago, Ill.). Characteristics at ambient temperature (about 25° C.): viscosity: 4.8 centipoise; surface tension: 29 dynes per square centimeter.

E. 14.5 parts by weight Brij 78 surfactant (obtained from ICI Americas, Wilmington, Del.); 81.1 parts by weight deionized water; 4.3 parts by weight 1-octanol; and 0.14 parts by weight Morfast Blue 100 dye (obtained from Morton International Specialty Chemicals Group, Chicago, Ill.). Characteristics at ambient temperature (about 25° C.): viscosity: 9.9 centipoise; surface tension: 27 dynes per square centimeter.

F. 9.98 parts by weight Tergitol 15-s-9 surfactant (obtained from Union Carbide Corp, Danbury, Conn.); 88.7 parts by weight deionized water; 1.17 parts by weight 1-octanol; and 0.16 parts by weight Morfast Blue 100 dye (obtained from Morton International Specialty Chemicals Group, Chicago, Ill.). Characteristics at ambient temperature (about 25° C.): viscosity: 9.5 centipoise; surface tension: 29 dynes per square centimeter.

G. 14.9 parts by weight Tergitol 15-s-20 surfactant (obtained from Union Carbide Corp, Danbury, Conn.); 80.7 parts by weight deionized water; 4.26 parts by weight 1-octanol; and 0.15 parts by weight Morfast Blue 100 dye (obtained from Morton International Specialty Chemicals Group, Chicago, Ill.). Characteristics at ambient temperature (about 25° C.): viscosity: 9.4 centipoise; surface tension: 29 dynes per square centimeter.

The inks thus prepared were then incorporated into a Hewlett-Packard 1200C thermal ink jet printer. This printer uses a heater to dry the images. The images thus formed exhibited excellent quality, high definition, sharp edges, and waterfastness. Optical density was not optimized, but it is believed that increased amounts of dye in the inks will improve this characteristic.

EXAMPLE II

The four ink compositions prepared in Example I parts A, B, C, and D are each incorporated into an acoustic ink jet printing test fixture utilizing the ejection mechanism disclosed in J. Appl. Phys. 65(9), 1 May 1989 and references therein, the disclosure of which is totally incorporated herein by reference. A jetting frequency of 160 MHz is used to generate drops of about 2 picoliters, up to 12 drops per pixel at 600 spi. It is believed that the images thus formed will exhibit excellent quality, high definition, sharp edges, and waterfastness.

Other embodiments and modifications of the present invention may occur to those skilled in the art subsequent to a review of the information presented herein, these embodiments and modifications, as well as equivalents thereof, are also included within the scope of this invention.

What is claimed is:

1. An ink composition which comprises water, an oil-soluble or alcohol-soluble dye, and a surfactant, said ink exhibiting a liquid microemulsion phase at a first temperature and, at a second temperature higher than the first temperature, separating into a mixture of an aqueous liquid phase and a liquid crystalline gel phase.

2. An ink composition according to claim 1 further containing a cosurfactant.

3. An ink composition according to claim 2 wherein the cosurfactant is an alcohol.

4. An ink composition according to claim 3 wherein the alcohol is a linear alcohol.

5. An ink composition according to claim 3 wherein the alcohol has from about 4 to about 12 carbon atoms.

6. An ink composition according to claim 3 wherein the alcohol has from about 8 to about 10 carbon atoms.

7. An ink composition according to claim 3 wherein the alcohol is selected from the group consisting of 1-propanol, 1-butanol, 1-pentanol, 1-hexanol, 1-heptanol, 1-octanol, 1-nonanol, 1-decanol, 1-undecanol, 1-dodecanol, 1,2-pentanediol, 1,2-hexanediol, 1,2-heptanediol, 1,2-octanediol, 1,2-nonanediol, 1,2-decanediol, 1,2-undecanediol, 1,2-dodecanediol, and mixtures thereof.

8. An ink composition according to claim 3 wherein the alcohol is selected from the group consisting of 1-hexanol, 1-heptanol, 1-octanol, 1-nonanol, 1-decanol, 1-undecanol, 1-dodecanol, 1,2-octanediol, 1,2-nonanediol, 1,2-decanediol, 1,2-undecanediol, 1,2-dodecanediol, and mixtures thereof.

9. An ink composition according to claim 3 wherein the alcohol is present in an amount of from about 1 to about 10 percent by weight.

10. An ink composition according to claim 3 wherein the alcohol and the surfactant are present in relative amounts of from about 1 part by weight alcohol and about 5 parts by weight surfactant to about 10 parts by weight alcohol and about 20 parts by weight surfactant.

11. An ink composition according to claim 1 wherein the dye is present in an amount of from about 0.01 to about 10 percent by weight.

12. An ink composition according to claim 1 wherein the dye becomes incorporated into the liquid crystalline phase at the temperatures at which the ink becomes separated into a mixture of an aqueous liquid phase and a liquid crystalline gel phase.

13. An ink composition according to claim 1 wherein the surfactant is present in an amount of from about 2 to about 30 percent by weight.

14. An ink composition which comprises water, an oil-soluble or alcohol-soluble dye, and a surfactant, said ink exhibiting a liquid microemulsion phase at a first temperature and, at a second temperature higher than the first temperature, separating into a mixture of an aqueous liquid phase and a liquid crystalline gel phase, wherein the surfactant is selected from the group consisting of oligoethyleneglycol alkyl ethers, oligoethyleneglycol fluorinated alkyl ethers, and mixtures thereof.

15. An ink composition which comprises water, an oil-soluble or alcohol-soluble dye, and a surfactant, said ink exhibiting a liquid microemulsion phase at a first temperature and, at a second temperature higher than the first temperature, separating into a mixture of an aqueous liquid phase and a liquid crystalline gel phase, wherein the surfactant is selected from the group consisting of (a) those of the general formula wherein n is an integer of from about 5 to about 20 and x is an integer of from about 5 to about 30, (b) those of the general formula $R(OCH_2CH_2)_nOH$ wherein R is a linear hydrocarbon chain or fluorinated hydrocarbon chain with from about 6 to about 20 carbon atoms and n represents the number of repeating units and is an integer of from about 5 to about 30, and (c) mixtures thereof.

16. An ink composition which comprises water, an oil-soluble or alcohol-soluble dye, and a surfactant, said ink exhibiting a liquid microemulsion phase at a first temperature and, at a second temperature higher than the first temperature, separating into a mixture of an aqueous liquid phase and a liquid crystalline gel phase, wherein the surfactant is selected from the group consisting of wherein n is 8 or 9, wherein x is 7 or 8, polyoxyethylene (20) stearyl ether, polyoxyethylene (20) cetyl ether, polyoxyethylene (10) oleyl ether, polyoxyethylene (20) oleyl ether, polyoxyethylene (23) lauryl ether, $C_{15}H_{31}O(CH_2CH_2O)_9H$, $C_{15}H_{31}O(CH_2CH_2O)_{15}H$, $C_{15}H_{31}O(CH_2CH_2O)_{20}H$, and mixtures thereof.

17. An ink composition according to claim 1 wherein the surfactant has an HLB value of from about 8 to about 18.

18. An ink composition according to claim 1 wherein the surfactant has an HLB value of from about 11 to about 17.

19. An ink composition according to claim 1 wherein the ink exhibits a liquid microemulsion phase at temperatures of below about 30° C. and separates into a mixture of an aqueous liquid and a liquid crystalline gel at a temperature which is at least about 30° C.

20. An ink composition according to claim 1 wherein the ink has a viscosity of from about 3 to about 12 milliPascal-seconds in the liquid microemulsion phase and wherein, when the ink has separated into a mixture of an aqueous liquid and a liquid crystalline gel, the liquid crystalline gell phase of the ink has a viscosity of at least about 100 milliPascal-seconds.

21. A printing process which comprises (a) incorporating into an ink jet printer an ink composition which comprises water, an oil-soluble or alcohol-soluble dye, and a surfactant, said ink exhibiting a liquid microemulsion phase at a first temperature and, at a second temperature higher than the first temperature, separating into a mixture of an aqueous liquid phase and a liquid crystalline gel phase; and (b) causing droplets of the ink to be ejected in imagewise pattern onto a substrate which has been heated to a temperature at which the liquid crystalline gel phase forms in the ink.

22. A printing process according to claim 21 wherein the ink jet printer is a thermal ink jet printer and wherein the ink is selectively heated in an imagewise pattern, thereby causing droplets of the ink to be ejected in an imagewise pattern.

23. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising water, an oil-soluble or alcohol-soluble dye, and a surfactant, said ink exhibiting a liquid microemulsion phase at a first temperature and, at a second temperature higher than the first temperature, separating into a mixture of an aqueous liquid phase and a liquid crystalline gel phase; and (b) causing droplets of said ink to be ejected onto a recording sheet in an imagewise pattern.

* * * * *